No. 717,061. Patented Dec. 30, 1902.
E. WITTE.
DEVICE FOR RINSING AND WASHING GLASSES, TUMBLERS, &c.
(Application filed July 17, 1902.)
(No Model.) 2 Sheets—Sheet 1.

Witnesses.
Inventor.
Ernst Witte
per Gerson Jacks
Attorneys.

THE NORRIS PETERS CO., PHOTO-LITHO., WASHINGTON, D. C.

UNITED STATES PATENT OFFICE.

ERNST WITTE, OF HILDESHEIM, GERMANY.

DEVICE FOR RINSING AND WASHING GLASSES, TUMBLERS, &c.

SPECIFICATION forming part of Letters Patent No. 717,061, dated December 30, 1902.

Application filed July 17, 1902. Serial No. 115,942. (No model.)

*To all whom it may concern:*

Be it known that I, ERNST WITTE, a subject of the Emperor of Germany, and a resident of Hildesheim, Germany, have invented a new and useful Device for Rinsing and Washing Glasses, Tumblers, and the Like, of which the following is a specification.

My invention has for its object to construct a device for rinsing and washing glasses and the like in such a manner that the inner surface of the said glasses is washed by means of a cylindrical brush which may be adapted in length to the length of the said glasses and that the rim may be carefully cleansed by means of brushes which automatically are firmly pressed thereagainst.

Figures 1, 2:
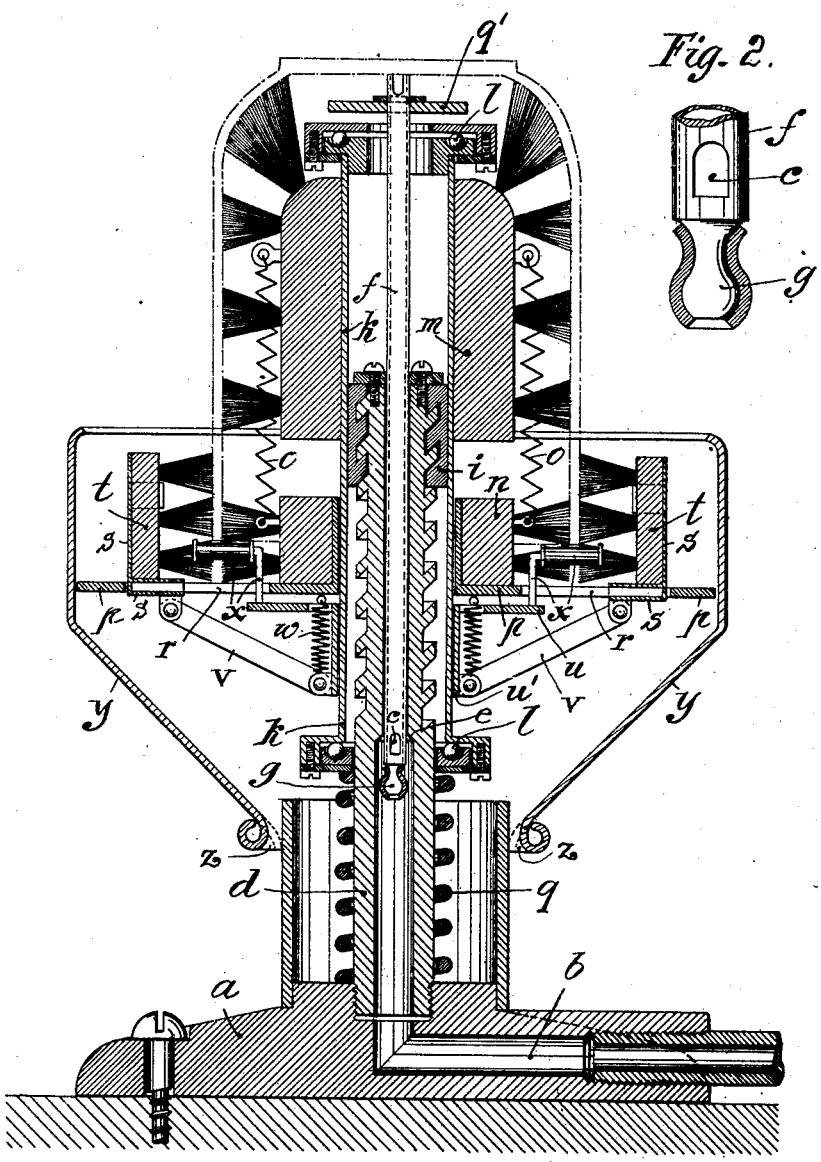
Figure 3:
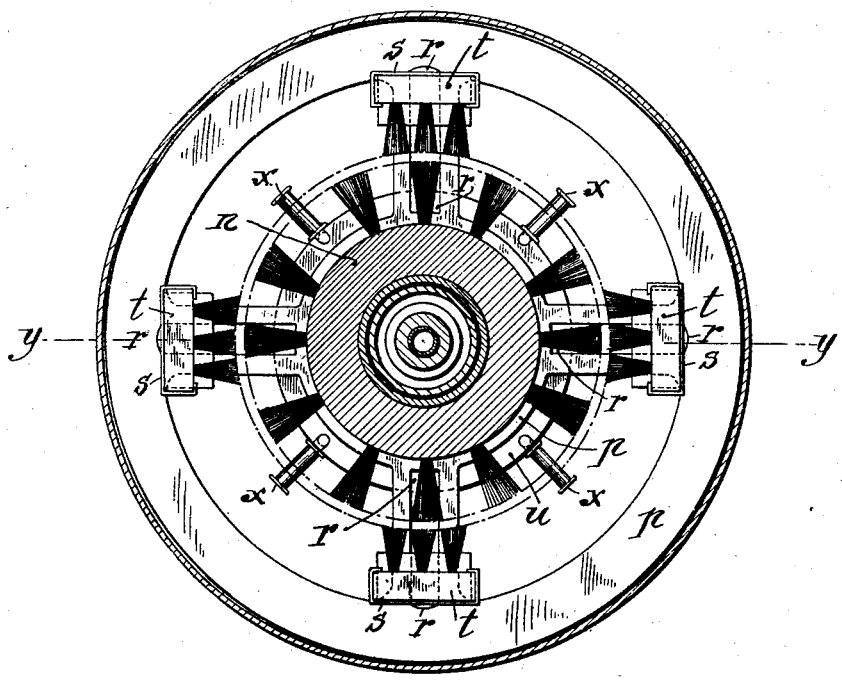

In the accompanying drawings, in which similar letters of reference refer throughout to similar parts, Figure 1 is a sectional elevation of the invention when the device is in use, the section being taken on the line $y\ y$ of Fig. 3, the arms $x$, hereinafter described, being shown in this plane of section for sake of clearness; but the real arrangement of this construction may be seen from Fig. 3. Fig. 2 is a detail, and Fig. 3 a plan view, of the device.

In the construction of my invention a base-plate $a$ is provided, which has a suitable water-conductor $b$, in connection with a vertically-extending pipe $d$, mounted on said plate. This pipe has formed on its inner surface at about midway its height a conical valve-seat $e$ and has its whole upper portion equally narrowed, so as to form a guide for a vertically-movable small pipe $f$, the lower end of which is closed by means of a rigidly-fastened valve-plug $g$, provided with a rubber packing, as shown in Figs. 1 and 2. This pipe and valve-plug is held upwardly against the valve-seat by the action of pressure-water entering through pipe $d$. The outer surface of the said upper portion of pipe $d$ is screw-threaded and is engaged by a threaded collar $i$, carrying the pipe $k$, with the ball-bearings $l$ at its upper and lower ends and the two-parted cylindrical cleaning-brush. The two parts $m$ and $n$ are connected by springs $o$. Part $m$ is fastened on pipe $k$, and part $n$, sliding on said pipe, is secured to a plate $p$, sliding on pipe $k$, by means of a suitable collar, as shown. A spring $q$, which surrounds the pipe $d$, supports pipe $k$, acting against its lower ball-bearing $l$. Tube $f$ extends a certain distance above said sleeve $k$ and carries near its upper end a rubber or fender $q'$. The top of said pipe $f$ is cut away, as shown in Fig. 1, so that when a flat surface is pressed against the same the flow of water therefrom is not intercepted.

The above-mentioned circular plate $p$ is cut out so as to have diametrically-slotted cross-arms, in the slots $r$ of which arms four slides $s$ are radially and freely movably guided, which carry brushes $t$ for acting against the outer surface of a glass to be cleansed. A plate $u$, having a suitable collar $u'$, is mounted on said pipe $k$ below plate $p$ and connected by suitable links $v$ with the four slides $s$ on plate $p$ and also connected, by means of springs $w$, to said plate $p$. Said plate $u$ carries angularly-bent arms $x$, extending over plate $p$, the horizontal portions of which radially extend over the outer circumference of the lower brush part $n$, thus forming stops for the rim of a glass to be placed over said brush.

A mantle $y$ surrounds the whole device and has outlets $z$ at its lower end for discharging the cleaning-water therethrough.

The operation of the invention will be clearly understood from the foregoing description, together with the following statement: A tumbler, mug, glass, or the like is placed in an inverted position over the device. The bottom of the glass contacts with tube $f$, whence the latter is depressed, thereby forcing said valve-plug and allowing the water passing through pipe $d$ to flow through openings $c$ on the sides of pipe $f$ (but one shown in Figs. 1 and 2) into said pipe, upward through the latter, and out through the cut-away end of tube $f$ into and against the inner surfaces of said glass. By pressing the glass still farther downwardly the rubber disk $q'$ engages the upper bearing $l$ and depresses the sleeve $k$, whence owing to the threaded collar $i$ and the screw-threaded spindle the sleeve $k$ is rapidly revolved, with the brushes $m$ and $n$, and the glass thoroughly cleansed. Simultaneously the brushes $m$ and $n$, owing to their spring connection $o$, have been adapted to length of the glass, and, further, the rim of said glass has forced down the angular arms $x$ of plate $u$, which moving downward draws the slides $s$ and brushes $t$ inwardly and firmly against the outer rim of the glass. By this means the glass is thoroughly cleansed and rinsed.

Having now described my invention, I claim—

A washing and rinsing device for glasses comprising a base-plate, a vertical pipe mounted thereon and provided in its upper part with a valve-seat and decreased bore, a valve-plug adapted to rest in said seat through pressure of water admitted into said pipe from the said base-plate, a vertically-movable tube mounted in said decreased bore of said pipe and connected to said plug and provided with an opening thereadjacent, a rubber disk near the upper end of said tube, a sleeve concentrically mounted about said pipe, ball-bearings carried by said sleeve at both ends thereof, a screw-thread on said pipe, a threaded collar on the inner side of said sleeve and engaging said screw-thread, a spring about said pipe and adapted to force said sleeve upwardly, a two-parted cylindrical brush having its upper part fastened to the upper portion of said sleeve, springs connecting the two parts of said cylindrical brush, a horizontal plate secured to the lower portion of said brush, radial slots therein, slides guided within said slots, brushes on said slides, a ring guided on said sleeve below said plate, springs for connecting said ring and plate and links connecting said ring and slides, substantially combined as for the purpose described.

ERNST WITTE.

Witnesses:
ROB WERNER,
LEONORE RASCH.